Oct. 18, 1960
R. RUPERT
2,956,476
REFLECTOR AND MOUNTING THEREFOR
Filed Oct. 3, 1958
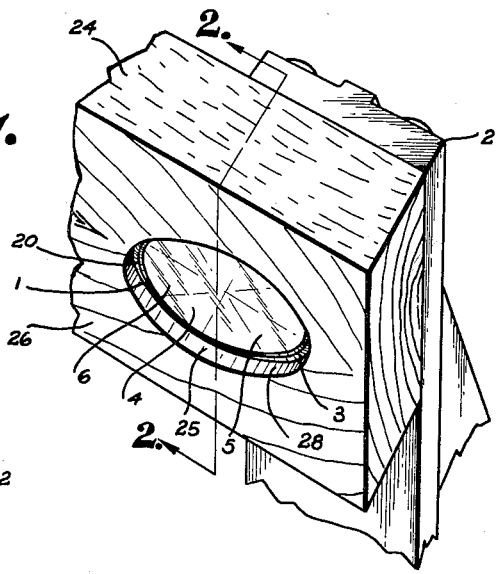
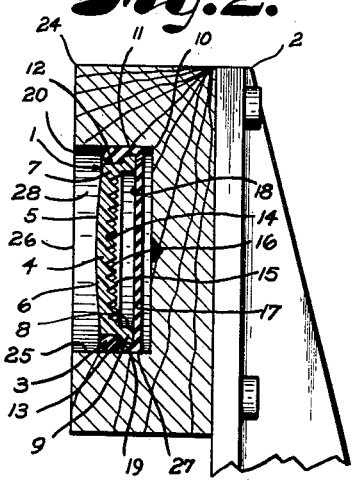
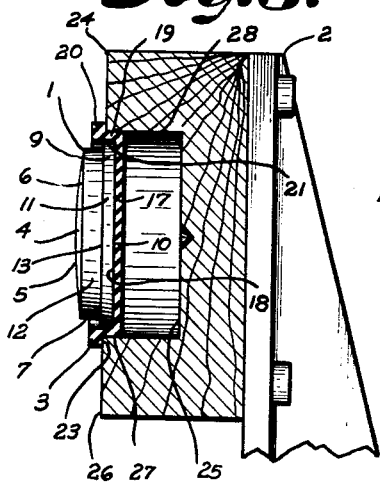
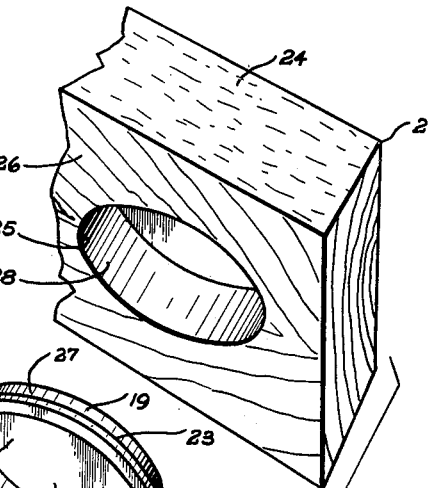
INVENTOR.
Richard Rupert.
BY
Fishburn and Gold
ATTORNEYS

United States Patent Office 2,956,476
Patented Oct. 18, 1960

2,956,476
REFLECTOR AND MOUNTING THEREFOR

Richard Rupert, Independence, Mo.
(405 S. 10th St., Blue Springs, Mo.)

Filed Oct. 3, 1958, Ser. No. 765,197

5 Claims. (Cl. 88—78)

This invention relates to reflecting devices and mountings therefor, and more particularly to structures including reflecting devices having solid transparent reflector portions which are constructed to reflect light impinging thereon from a distant source back to the general direction of the light source irrespective within limits of the angle of instance of the impinging light.

Solid transparent reflecting devices having a series of reflecting units with reflecting surfaces arranged relatively at approximately right angles and in a circuit about the axis thereof have been used at points of danger to reflect beams of light to apprise approaching persons of the danger point or other location. Such reflecting devices have been reflecting units with each unit having three reflecting surfaces on the rear faces arranged to intersect at a common point with the reflecting surfaces at right angles to each other, such as, in effect, the corner of a cube whereby a beam of light originating in front of the reflecting device and directed toward the front face thereof impinges on such a reflecting surface and is reflected from surface to surface about the axis and back along the instant beam. Such reflecting units preferably are prismatic and have highly polished surfaces in proper angular relation to form substantially optically true congruent trihedral angles. It is common practice for such reflecting devices to have spherical front faces. Such reflectors are usually in the form of discs of glass or synthetic resin material with the individual reflecting units so closely associated that the effect is that of a single large reflector. The reflecting devices may be of the lens reflector type or of the prismatic type which is also referred to as the central triple type. In so-called "solid" transparent reflecting devices having highly polished reflecting surfaces on the rear faces, dust, condensation or coatings collecting or deposited on such polished reflecting surfaces materially reduce the reflecting efficiency of the device. Various mountings have been used for single reflecting discs wherein fastening devices are secured to a support with a gasket between the edge of the reflector disc and the support to reduce the deposit of dust and other coating materials on the polished surfaces. It is also common practice to mount the reflectors on the surfaces of a support whereby the reflectors extend outwardly therefrom and are subject to easy removal and also damage from impact by other objects.

The principal objects of the present invention are to provide a reflector and mounting that forms a hermetically sealed structure; to provide a reflector assembly including a housing or support having an open recess therein with a resilient cup-like member insertable into said recess and adapted to receive a reflecting unit with the cup-like member being deformable by insertion into the recess to resiliently and snugly fit the edge of the reflector unit; to provide such a reflector and mounting wherein the cup-like member and reflector form a hollow hermetically sealed structure with the reflector in a recess in a substantially theft-proof arrangement which also protects the reflector from impacts of other objects; and to provide a reflector and mounting therefor that is economical to manufacture, quickly and easily assembled and arranged in a supporting member to form a hermetically sealed structure with a protected reflector for long life with continuous maximum efficiency and power reflection.

Other objects and advantages of this invention will become apparent from the following description taken in connection with the accompanying drawings wherein are set forth by way of illustration and example certain embodiments of this invention.

Fig. 1 is a perspective view of a reflecting device in a supporting structure.

Fig. 2 is a vertical sectional view through the reflector and supporting device on the line 2—2, Fig. 1.

Fig. 3 is a vertical sectional view through the supporting device with the reflector and mounting partially inserted in the recess in the support.

Fig. 4 is a disassembled perspective view of the reflector, mounting and support.

Referring more in detail to the drawings:

1 designates a reflector assembly comprising a support 2, a mounting member 3 and a reflecting device 4. In the illustrated structure, the reflecting device 4 is circular in form and has a smooth outer or front face 5. The face 5 may be plane, convex or concave, however, in the illustrated structure the face is convex and substantially spherical. The face 5 is on a disc-like wall 6 terminating at its margin or periphery in a peripheral flange 7 extending rearwardly relative to the face 5. The rear portion of the peripheral flange 7 has an annular recess 8 inwardly thereof and an outwardly extending annular flange 9 having a rear face 10 that is preferably flat and perpendicular to the axis of the reflecting member. The outer peripheral face 11 of the flange 9 is larger and spaced outwardly from the peripheral surface 12 of the disc-like member 6 to provide a shoulder or forward face 13 between the peripheral surfaces 11 and 12. In the illustrated structure, the face 5 is convex and the reflecting formations 14 conform generally to the contour of the front face of the reflecting disc 6. The back or rear of the disc 6 of the reflecting member has a series of prismatic reflecting units 15 of the central triple reflector type thereon, and the axes of the reflecting units are parallel. Generally, the reflector units 15 are each of the character in which a series of reflecting surfaces 16 are arranged relatively at approximate right angles and in a circuit around the reflector unit axis so that light entering the front face of the reflecting member from a distant source will impinge on the reflecting surfaces 16 of the units 15 and will be successively reflected by said surfaces 16 about the axis and back in the general direction of the light source. The units are arranged whereby perimeters thereof as defined by the outer extremities of the surfaces 16 of each unit form, in effect, a hexagonal aperture or area through which light originating in front of the unit and directed toward the front face passes to the reflecting faces. The prismatic formation of the reflecting member may be arranged and oriented as shown and described in the Rupert Patent No. 2,676,518 or otherwise suitably arranged and oriented to obtain the desired angular range or field from which the reflector will be visible. The reflector units 15 on the rear face of the disc-like member 6 are spaced forwardly of the plane of the rear surface 10 of the annular flange 9 as illustrated in Fig. 2.

The mounting member 3 is preferably in the form of a flexible cup-like member formed of resilient material such as rubber or flexible synthetic resins such as vinylite, polyethylene or polypropylene. The cup-like member 3 preferably includes a disc-like wall 17 having a forward face 18 adapted to engage the rear face 10 of the annular flange 9 of the reflecting device. The wall 17 terminates at its periphery in a forwardly extending peripheral wall 19 having an outwardly extending annular flange or enlarged portion 20 at its forward end. The peripheral wall 19 has an inner surface 21 of a shape and size to closely engage the peripheral surface 11 of the annular flange 9 of the reflecting device when the reflecting device is inserted into the recess 22 in said cup-like member 3. The annular flange 20 preferably has a rear face 23 substantially in the same plane as the shoulder 13 of the reflecting device when the rear face 10 is engaged with the face 18 of the wall 17, as illustrated in Fig. 3, whereby said flange 20 or enlarged portion is forwardly of a front face or marginal portion adapted to be engaged thereby to form a hermetical seal as later described.

The support 2 may be a barricade having a crossbar 24 provided with a recess or socket 25 opening from a front face 26 on the side from which light is to be reflected. The support may be any wall, housing or the like in which it is desired to mount a reflector wherein such wall, housing or the like has a recess 25 corresponding substantially in size and shape to the periphery 27 of the wall 19 of the cup-like member 3 whereby said peripheral wall 27 will engage the inner face 28 of the recess, as illustrated in Fig. 3.

The recess 25 may be a through bore in the wall or member 24 and may terminate in a bottom spaced from the face 26 a depth greater than the area of the cup-shaped member 3 that will engage the inner surface of said recess. It is also preferable that the recess be of uniform peripheral shape in the area to be engaged by said cup-shaped member.

In assembling the reflecting device and cup-shaped member in a holder or housing, the reflecting device 4 is inserted into the socket of the cup-shaped member 3 whereby the rear face 10 of the flange 9 of the reflector engages the forward face 18 of the wall 17 of the cup-shaped member 3. Then the assembly of the reflecting device and cup-shaped member is moved to insert the cup-shaped member into the recess 25 until the rear face of the flange 20 engages the forward face 26 of the holder or support, as illustrated in Fig. 3. Then pressure is applied to the front face of the reflector to force the reflector and cup-shaped member into the recess 25, and due to the flexible and resilient nature of the material of the cup-shaped member, the forward portion of the peripheral wall 19 and the flange 20 are bent and compressed inwardly and forwardly during movement of the reflector and cup-shaped member into the recess to form same around the shoulder 13 and periphery 12 of the reflecting device and effect a tight sealing engagement therebetween. The thickness of the annular flange or enlarged portion 20 is preferably greater than the width of the shoulder 13 whereby the portion of the cup-shaped member turned inwardly forwardly of the shoulder 13 is compressed between the inner surface 28 of the recess and the peripheral surface 12 of the reflective device, as illustrated in Fig. 2. This provides substantial resilient pressure effecting frictional engagement between the cup-shaped member 3 and the surface 28 of the recess 25 to retain the reflecting device and mounting in said recess of the support or holder for the reflector, and also provides substantial pressure between the cup-shaped member and the reflecting device at the periphery thereof to effect a hermetic seal therebetween whereby no moisture, dust or other material may enter the space between the wall 17 of the cup-shaped member and the disc-like portion of the reflecting device and be deposited on the reflecting surfaces.

In using such reflecting device, the beam of light is directed toward the front face of the reflector and is successively reflected by the surfaces of the reflecting units back through the reflector in a general direction of the light source. Therefore, in operation, the reflecting surfaces could be said to generally face the front face and substantially complete reflection of the light impinging thereon. When the reflecting device is arranged in a recess, as illustrated in Fig. 2, it is substantially theft-proof as there are no areas to grasp in removing the reflector from the recess, and even if there were, substantial forces would be required due to the gripping action between the cup-shaped member and the surface 28 of the recess. Furthermore, the reflecting device, being in the recess with no portions extending forwardly from the face 26 of the holder or support, protects the reflector against impact from objects passing by and reduces danger of injury to the reflector from collisions or the like.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A reflecting device comprising, a support having a face and a recess extending therein from said face, a cup-shaped mounting member of resilient flexible material having a peripheral wall, a disc-like reflector having front and rear surfaces in said cup-shaped mounting member in engagement with the peripheral wall thereof, said cup-like mounting member having an outwardly extending enlarged portion on the peripheral wall thereof forwardly of the portion of the reflector engaged with said peripheral wall, said enlarged portion being normally larger than the recess and deformed inwardly by the periphery of the recess and compressed into sealing engagement between the periphery of the reflector and the periphery of the recess as said reflector and mounting member are moved together to position said enlarged portion in said recess and to retain said reflector therein.

2. A reflecting device comprising, a support having a face and a recess extending therein from said face, a disc-like reflector having a forward face, a cup-shaped mounting member of resilient flexible material having a forwardly extending peripheral wall with an inner surface engaging the periphery of the reflector and having an outer surface engaging the peripheral surface of the recess, said cup-like mounting member having an enlarged outwardly extending annular portion on the peripheral wall thereof forwardly of the portion of the periphery of the reflector engaged with said peripheral wall, said enlarged annular portion being deformed inwardly by the periphery of the recess and into sealing engagement with the reflector adjacent the peripheral margin thereof as said reflector and mounting member are moved together to position said enlarged annular portion in said recess to retain said reflector in the cup-like mounting member, said enlarged portion having resilient frictional engagement with the periphery of the recess to retain said mounting member therein.

3. A warning signal comprising, a housing having a face and a recess extending therein from said face, a reflector having a disc-like wall portion with opposite front and rear faces, said disc-like wall portion having a periphery of reduced size adjacent the forward face, a mounting member of resilient flexible material and having a disc-like wall at the rear of the reflector and engaging same adjacent the periphery thereof, and a peripheral wall integral with the disc-like wall of the mounting member and extending forwardly therefrom in engagement with the periphery of said reflector and terminating in an outwardly extending annular flange surrounding the reduced periphery of the reflector disc-like wall portion, said mounting member peripheral wall having an outer surface conforming to the shape and size of the periphery of the recess and said reflector and mounting member being positioned in the recess in spaced relation to said housing face with the annular flange of the mounting member deformed by the housing into sealing engagement with the periphery of the disc-like wall portion of said reflector as the reflector and mounting member are moved into position within the recess.

4. A reflecting device comprising, a support having a face and a recess of substantially uniform size extending therein from said face, a reflector having a disc-like wall portion with opposite front and rear faces with formations on the rear face thereof forming reflecting areas, an integral annular flange on the reflector disc-like wall portion and extending outwardly therefrom in spaced relation to said front face, a mounting member of resilient flexible material and having a wall at the rear of the reflector and engaging the annular flange thereof, a peripheral wall integral with said wall of the mounting member and extending forwardly therefrom and in engagement with the periphery of said annular flange, and an outwardly extending annular flange integral with the peripheral wall of the mounting member and forwardly of the annular flange of the reflector, said peripheral wall of the mounting member having an outer surface conforming to the shape and size of the periphery of the recess and said reflector and mounting member being positioned in the recess with the annular flange of the mounting member deformed by the support into sealing engagement with the periphery of the disc-like wall portion and the annular flange of the reflector as the reflector and mounting member are moved together into position in the recess spaced from the support face, said annular flange of the mounting member resiliently and frictionally engaging the periphery of the recess to retain said mounting member and reflector in the recess of the support.

5. A reflecting device comprising, a support having a face and a recess of substantially uniform size extending therein from said face, a reflector formed of thermoplastic resin and having a disc-like wall portion with opposite front and rear faces with formations on the rear face thereof forming reflecting areas, a peripheral wall integral with the disc-like wall portion and extending rearwardly in surrounding relation to the reflecting areas, an integral annular flange on the peripheral wall and extending outwardly therefrom in spaced relation to said front face, a mounting member of resilient flexible material and having a disc-like wall at the rear of the reflector and engaging the annular flange thereof, a peripheral wall integral with the disc-like wall of the mounting member and extending forwardly therefrom to define a forwardly opening cavity, said peripheral wall of the mounting member having an outer surface substantially conforming in size and shape to the periphery of the recess and an inner surface substantially conforming in size and shape to the periphery of the annular flange of the reflector, said reflector being positioned in said cavity with the periphery of said annular flange in engagement with the inner surface of said peripheral wall of the mounting member, and an annular flange integral with the peripheral wall of the mounting member and normally extending outwardly therefrom beyond said recess and with the rear of said annular flange on the mounting member substantially in the plane of the front of the annular flange of the reflector, said mounting member being positioned in the recess in spaced relation to the face of the support with the annular flange of the mounting member deformed inwardly by the support into sealing engagement with the periphery of the peripheral wall portion and the annular flange of the reflector, said annular flange of the mounting member resiliently and frictionally engaging the periphery of the recess to retain said mounting member and reflector in the recess of the support.

References Cited in the file of this patent

UNITED STATES PATENTS

| | | |
|---|---|---|
| 1,900,945 | Myers | Mar. 14, 1933 |
| 2,050,435 | Howard | Aug. 11, 1936 |
| 2,215,829 | Evans | Sept. 24, 1940 |
| 2,229,179 | Langdon | Jan. 21, 1941 |
| 2,542,894 | Blanchard | Feb. 20, 1951 |
| 2,831,398 | Tiegler | Apr. 22, 1958 |

FOREIGN PATENTS

| | | |
|---|---|---|
| 536,702 | Great Britain | May 23, 1941 |